(12) United States Patent
Wroblewski

(10) Patent No.: US 8,079,456 B1
(45) Date of Patent: Dec. 20, 2011

(54) SPRING DETANGLER

(76) Inventor: Lucien J. Wroblewski, Downers Grove, IL (US)

(*) Notice: Subject to any disclaimer, the term of this patent is extended or adjusted under 35 U.S.C. 154(b) by 225 days.

(21) Appl. No.: 12/474,623

(22) Filed: May 29, 2009

Related U.S. Application Data

(60) Provisional application No. 61/057,458, filed on May 30, 2008.

(51) Int. Cl.
*B65G 29/00* (2006.01)

(52) U.S. Cl. .................... 198/392; 198/396; 198/397.04; 198/689.1

(58) Field of Classification Search .................. 198/392, 198/396, 397.04, 689.1; 221/163, 164, 167, 221/231, 278
See application file for complete search history.

(56) References Cited

U.S. PATENT DOCUMENTS

| | | | |
|---|---|---|---|
| 3,042,181 A * | 7/1962 | Rise | 198/391 |
| 3,542,185 A | 11/1970 | Geyer | |
| 4,035,029 A | 7/1977 | Lindstrom | |
| 4,050,610 A | 9/1977 | Sturm | |
| 4,120,392 A | 10/1978 | Sturm | |
| 4,156,494 A | 5/1979 | Nelson | |
| 4,220,257 A | 9/1980 | Hazelwood | |
| 4,413,659 A | 11/1983 | Zangerly | |
| 4,739,873 A | 4/1988 | Yajima | |
| 4,825,995 A * | 5/1989 | Nalbach | 198/380 |
| 5,267,639 A | 12/1993 | Amoh | |
| 5,740,899 A * | 4/1998 | Pugh et al. | 198/392 |
| 5,826,698 A | 10/1998 | Sawada | |
| 6,041,914 A | 3/2000 | Graham | |
| 7,150,349 B2 | 12/2006 | Meynieux | |

* cited by examiner

*Primary Examiner* — Leslie A Nicholson, III
(74) *Attorney, Agent, or Firm* — Patnaude and Videbeck

(57) ABSTRACT

An automated spring detangler takes clumps of springs and whirls them around a rotating chamber. When they separate and fall to the bottom of the container, they are sucked into a delivery tube that continuously individually deposits them at an assembly line which may be remote from the detangler. Any non-separating clumps of springs are periodically ejected from the container.

13 Claims, 12 Drawing Sheets

SPRING DETANGLER

This invention relates to spring detanglers for commercial and industrial applications, and more particularly, to improvements in machines for mechanically separating springs from clumps of same. Applicant claims priority of U.S. Provisional Application 61/057,458, filed May 30, 2008.

BACKGROUND OF THE INVENTION

As part of assembly line or automatic assembly machinery, springs of all types, both compression and tension springs, are used in the manufacture and assembly of industrial, commercial and consumer products. While it is possible that springs could be manufactured adjacent an assembly line where they are utilized, such as shown in U.S. Pat. Nos. 4,413,659; 4,120,392; and 4,050,610, it is more likely that springs will be obtained by a product manufacturer from an outside vendor and delivered to the assembly line, most likely in boxes or other containers where the springs are deposited after manufacture.

Springs shipped in pallets or boxes may form clumps of articles that ordinarily require costly manual labor to separate and prepare for individual application on an assembly line. This is true both for compression springs, and to an even larger extent for tension springs that may be made with hooks or fastener receiving loops that extend from their respective ends.

Heretofore, it has been known to utilize vibratory apparatus for separating both tension and compression springs. Such machinery is disclosed in U.S. Pat. Nos. 5,267,639; 4,739,873; 6,041,914; 3,542,185; 5,826,698; 4,035,029. While vibration may separate tangled springs, it may also cause springs to become more tangled. Other mechanical detanglers such as shown at U.S. Pat. No. 7,150,349 have utilized a pawl to bounce compression spring outwardly of a feed trough when they are tangled.

Wholly mechanical spring detanglers are shown in U.S. Pat. Nos. 4,156,494 and 4,220,257. Similarly to the '349 patent noted above, these two patents utilize the elastic function of coiled springs to bounce the springs around in a chamber utilizing a rotating base within the chamber having differing shaped longitudinal bumpers positioned radially thereon. As the springs are dropped into the hollow cylindrical chamber, and they impinge on the rotating bottom of the chamber, or on any of the bumpers mounted on the rotating bottom disk in the chamber, those springs may tend to separate and bounce around the chamber. A relatively large opening with respect to the size of the spring, is positioned adjacent the top of the chamber to receive springs that would ordinarily, in a random fashion, impinge on the top of the chamber side wall and more through an opening therein. These springs then generally proceed by gravity downward where they are deposited individually for use in a product manufacturing process. Due to the size of the chamber openings, clumps of springs may also move through the chamber opening. Also, no individual spring orientation, such as an end to end configuration, can be provided.

SUMMARY OF THE INVENTION

A need has arisen for improvements in the mechanical separation of tangled springs as they come in bulk form from spring manufacturers. Additionally, it may be desirable to maintain such spring detangling apparatus at a location that is not immediately adjacent an assembly line so that assembly line personnel, or robotic means may be given more room to perform their appointed tasks.

Additionally, as there may be instances where clumps of such tangled springs will not completely separate, it is desirable to have a means for evacuating such clumps from the detangler chamber while the machinery is still running, without having the shut down the machinery.

It is, therefore, an object of the present invention, generally stated, to provide a new and improved mechanical spring detangler for use in serially delivering springs to a position immediately adjacent an assembly line.

Another object of the present invention is the provision of an improved spring detangler that further detangles springs between their being positioned in a feed hopper and their gravity feed into a detangler chamber.

Another object of the present invention is the provision of a pneumatically operated dispenser capable of capturing detangled springs and delivering them to a location remote from the immediate area of the spring detangler.

It is another object of the present invention to provide a spring detangler that does not rely on the bouncing of springs in the chamber to deliver those springs to an exit port above the bottom of the chamber.

The invention resides in a spring detangling apparatus including a generally hollow cylindrical housing with a rotating disk inwardly adjacent a bottom of the housing. The improvement comprises a centrifugal action caused at least in part by the rotation of said cylindrical disk positioning any spring positioned thereon in a position substantially tangential to an outer edge of said disk. The invention further includes a discharge opening having a shape substantially similar and slightly larger than a cross section shape of any spring fed through such apparatus in a side wall of the housing radially outwardly from the rotating disk drawing a vacuum therethrough to physically draw individual springs threadjacent into and through the discharge opening.

BRIEF DESCRIPTION OF THE DRAWINGS

The features of the present invention which are believed to be novel are set forth with particularity in the appended claims. The invention may best be understood from the following detailed description of a currently preferred embodiment thereof taken in conjunction with the accompanying drawings wherein like numerals refer to like parts, and in which:

DETAILED DESCRIPTION OF THE PREFERRED EMBODIMENT

Figure 1:
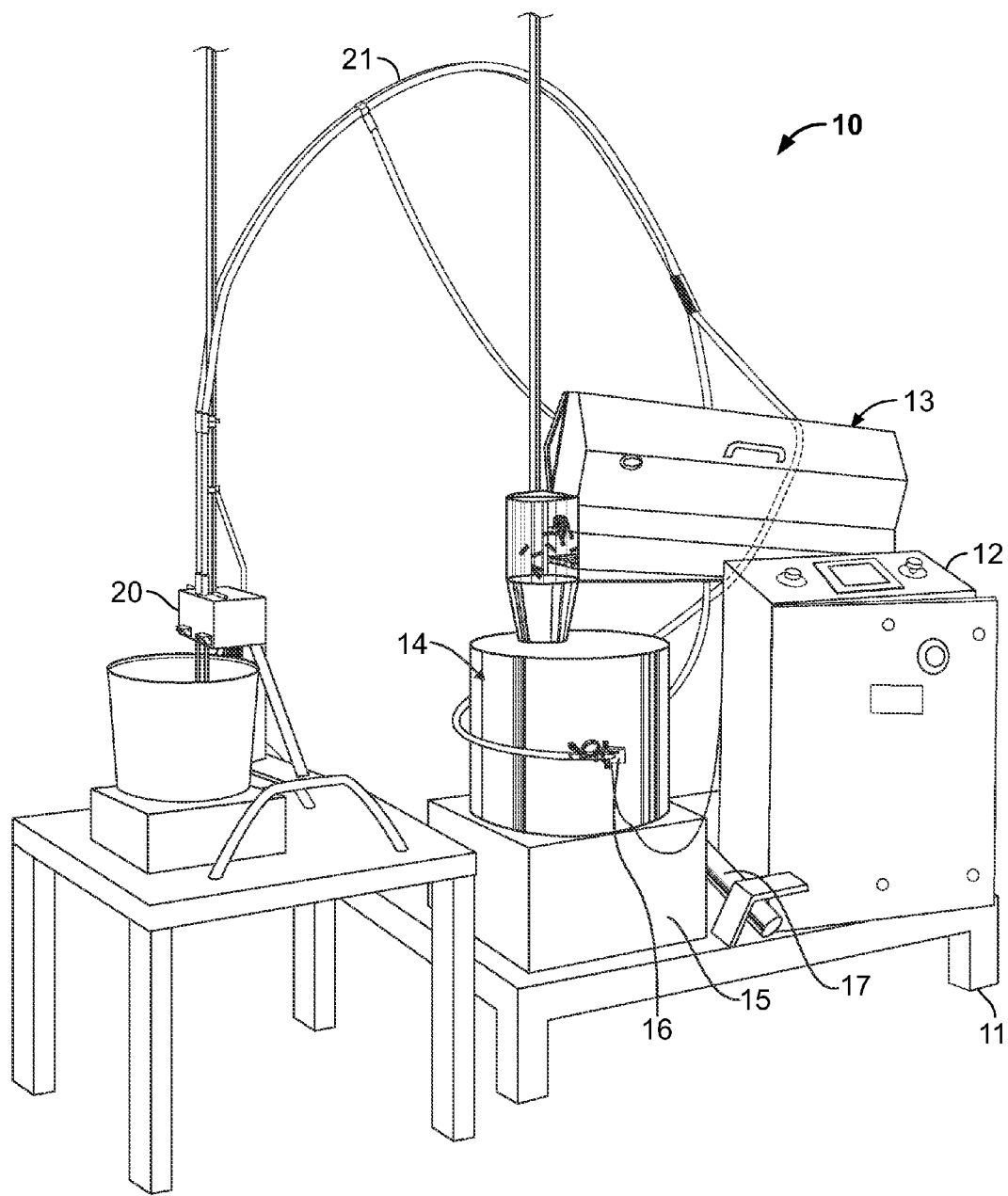
FIG. 1 is a perspective view of an improved spring detangler, constructed in accordance with the present invention.
Figure 2:
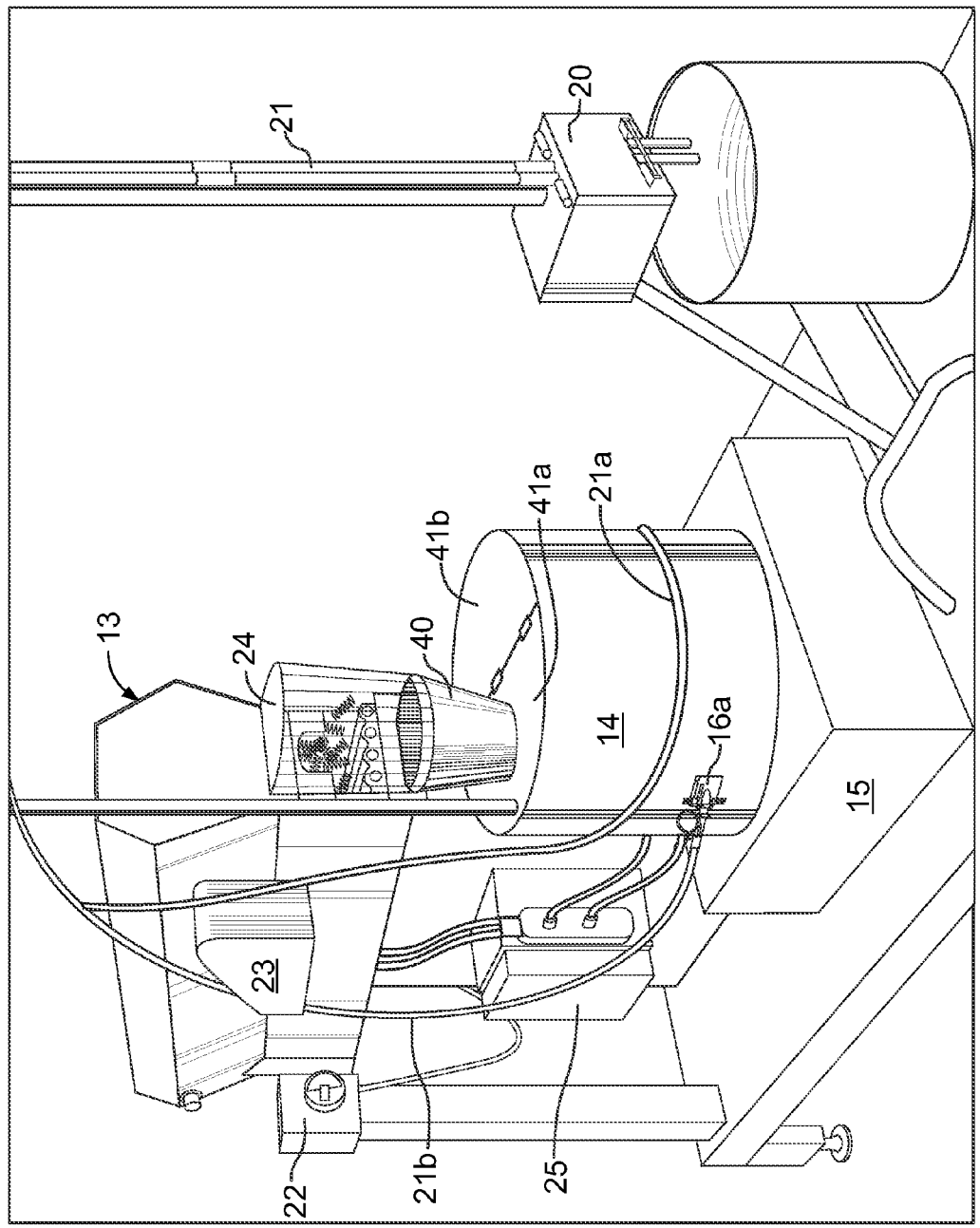
FIG. 2 is a perspective view of the front end of the spring detangler shown I FIG. 1 showing the delivery end of the hopper and the centrifuge canister together with the end feed.

Referring to FIGS. 1 and 2, a spring detangler assembly, generally indicated at 10, constructed in accordance with the present invention, is mounted on a frame 11 and includes an electric control panel and touch screen generally indicated at 12, behind and above which is positioned a feed hopper, generally indicated at 13, which feeds springs into a hollow cylindrical detangler chamber, generally indicated at 14, that is powered by an electric motor (not shown) from beneath mounted in the motor chamber 15.

Individual springs exit the detangler chamber through the dispenser feed tubes 16, 16a (FIG. 2) while intransient clumps of springs exit through the auto-avoid outlet 17. The dispenser feed tubes 16, 16a lead to the spring dispenser, generally indicated at 20. The dispenser 20 can dispense one or more streams of serially oriented rows of springs.

Referring to FIG. 2, electric motors at chamber 22 and inside housing 23 drive the hopper augers, to be discussed in more detail below, inside the hopper 13. The motor (not shown) inside motor housing 23 drives a paddlewheel, to be discussed in more detail below, that operates perpendicularly to the augers adjacent the discharge end 24 of the hopper 13. A compressed air line feeds into a manifold including pneumatic valves inside housing 25 and is directed to other parts of the assembly, to be discussed in more detail below.

Figure 3:
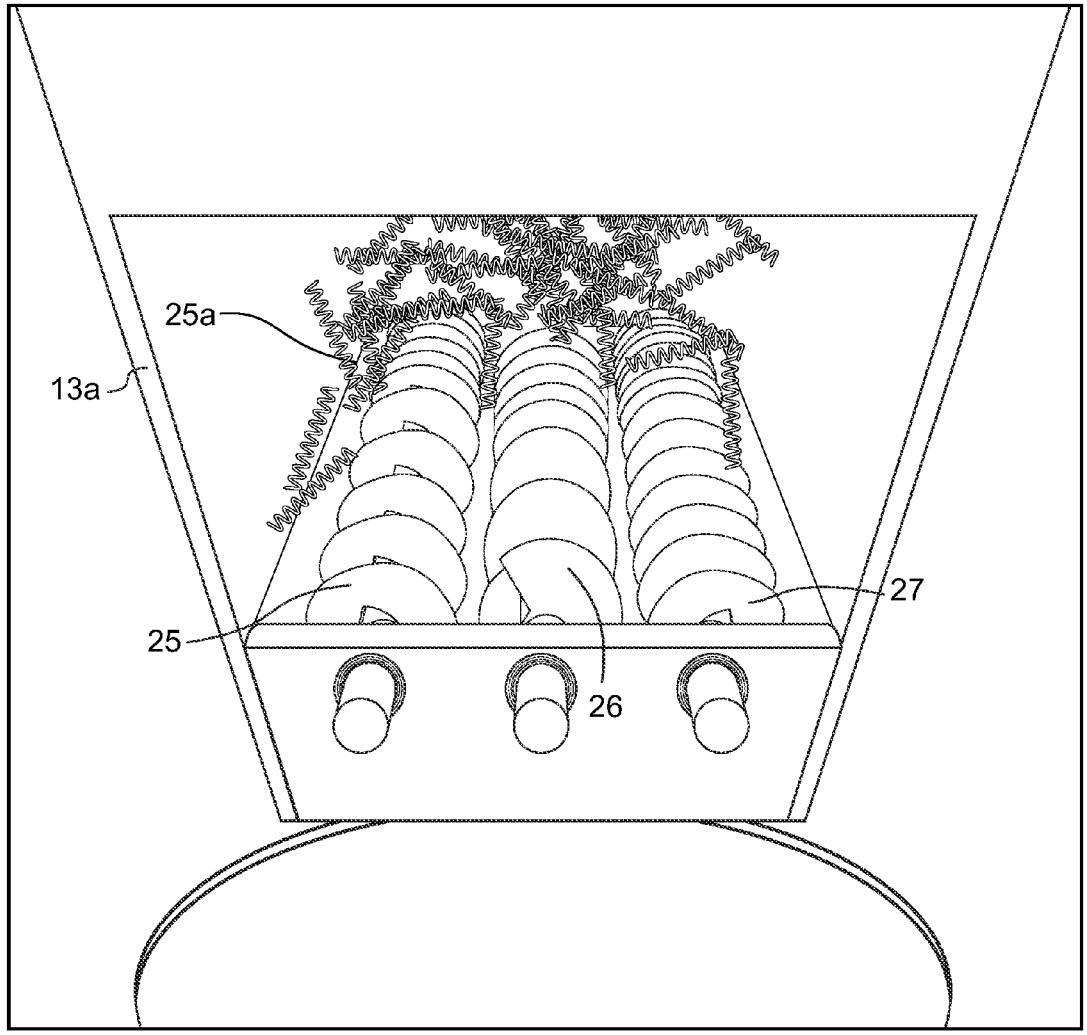
FIG. 3 is a detail view with portions removed, of a modification of the preferred embodiment shown in FIG. 1, showing three spiral feed shafts mounted in a hopper.

FIG. 3 is a prototype, or first modification of the invention, of the augers 13a in a three-auger hopper. The augers are driven from behind by an electric motor as shown in FIG. 2. The augers 25, 26, and 27, each have a plurality of differing screw thread pitches thereon such as shown at 25 and 25a in FIG. 3. A third type of auger thread (not shown) exists at the back end of each of the augers 25, 26 and 27. The differing auger screw threads or pitches as encountered by a spring that proceeds along the auger from a receiving end thereof to a delivery end help to begin to separate the individual springs 18-18 from the clumps thereof that are dumped or deposited in the hopper 13-13a.

A hopper discharge cover 24 is preferably made of plastic and extends between and covers both the discharge end of the hopper 24a and a funnel-like opening 40 adjacent the top of the detangler chamber 14.

Figure 4:
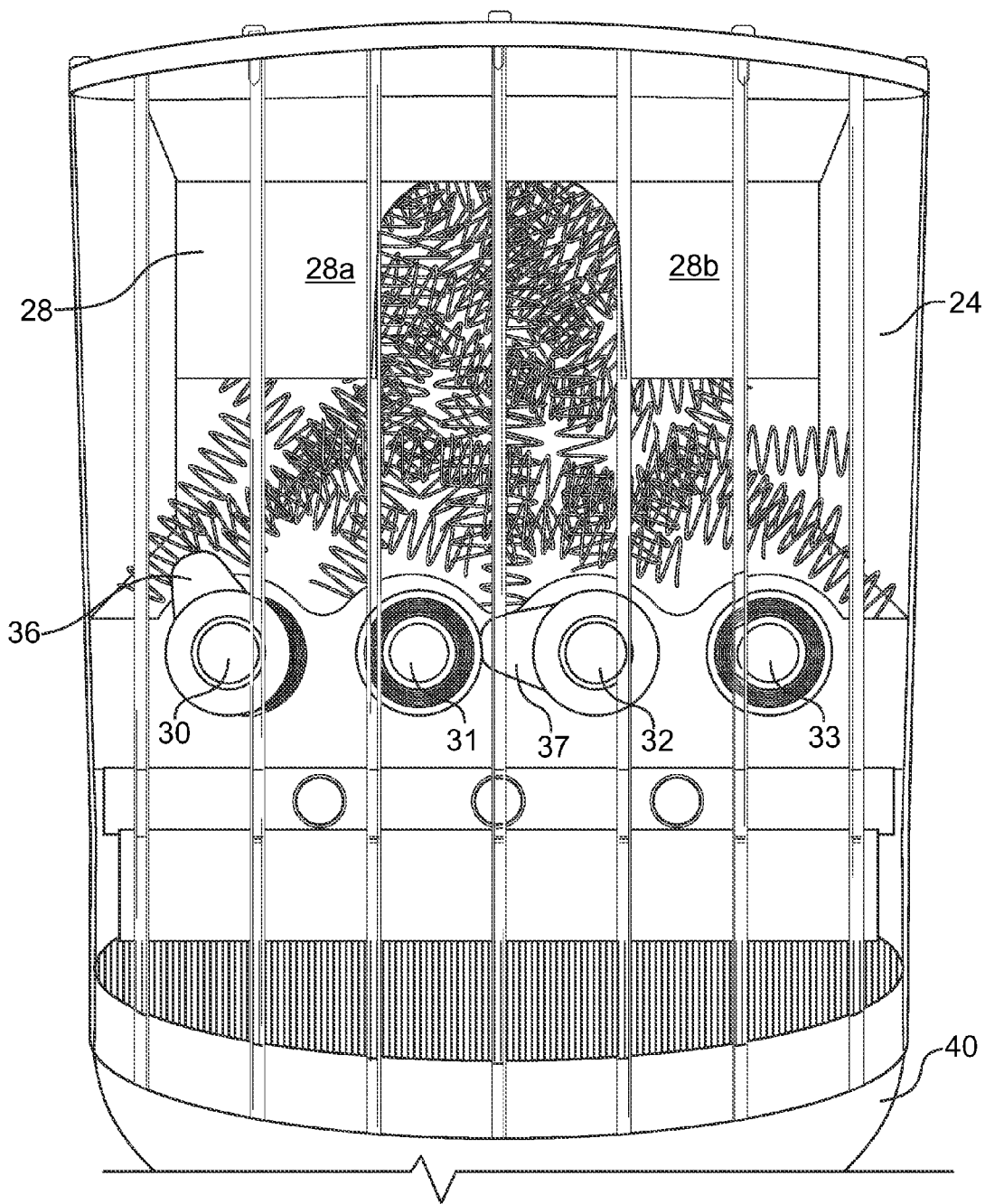
FIG. 4 is an end elevational view of the completed feed end of the hopper of the embodiment shown in FIG. 1 showing rotating cams on the ends of two of the four spiral shafts and a rotating paddle wheel mounted in the hopper perpendicular to the spiral shafts.

Referring to the first embodiment of FIGS. 2 and 4, the discharge hopper also includes a paddlewheel, shown at 28, that is driven by the motor inside motor housing 23 and rotates perpendicularly to the augers 30, 31, 32, 33 shown in FIG. 4. Paddlewheel 28 includes on one side of the rotating axle (not shown) thereof, opposed separated ends 28a and 28b and on the opposing side thereof (not shown) a single central arm. The slow rotation of the paddlewheel engages springs as the augers are moving the clumps of springs forward toward the hopper discharge 24 and helps to separate the springs 18-18 and may indeed impel them away from the hopper discharge in order to prevent large clumps of springs from dropping into the funnel.

Also, as shown most clearly in FIG. 4, two of the four augers, in this embodiment augers 30 and 32, have cams 36, 37 positioned on their discharge ends to rotate along with the augers and help to additionally separate springs as they are moved by the augers 30, 33 and the paddlewheel 28 toward the hopper discharge.

As the individual springs 18-18 and remaining clumps thereof fall over the open end of the hopper discharge and over the rotating cams at the ends of augers 30 and 32, quite a number of them will already be detangled and fall individually by gravity into the top funnel shape opening 40 of the spring detangler chamber 14.

In this preferred first embodiment, the spring detangler chamber 14 is a hollow generally cylindrical chamber approximately 18 inches in diameter and 12 inches high, although other dimensions may be utilized depending upon the size of springs separated and the amount of springs traveling through the machine with the funnel shape opening 40 positioned on one half of the chamber top 41 thereof. The other half of the top 41a is hinged at 41b to allow the top to be opened for inspection and servicing if necessary. In the preferred embodiment, stainless steel is the material of choice for the assembly, although other materials may be used within the scope of the invention.

Figure 5:
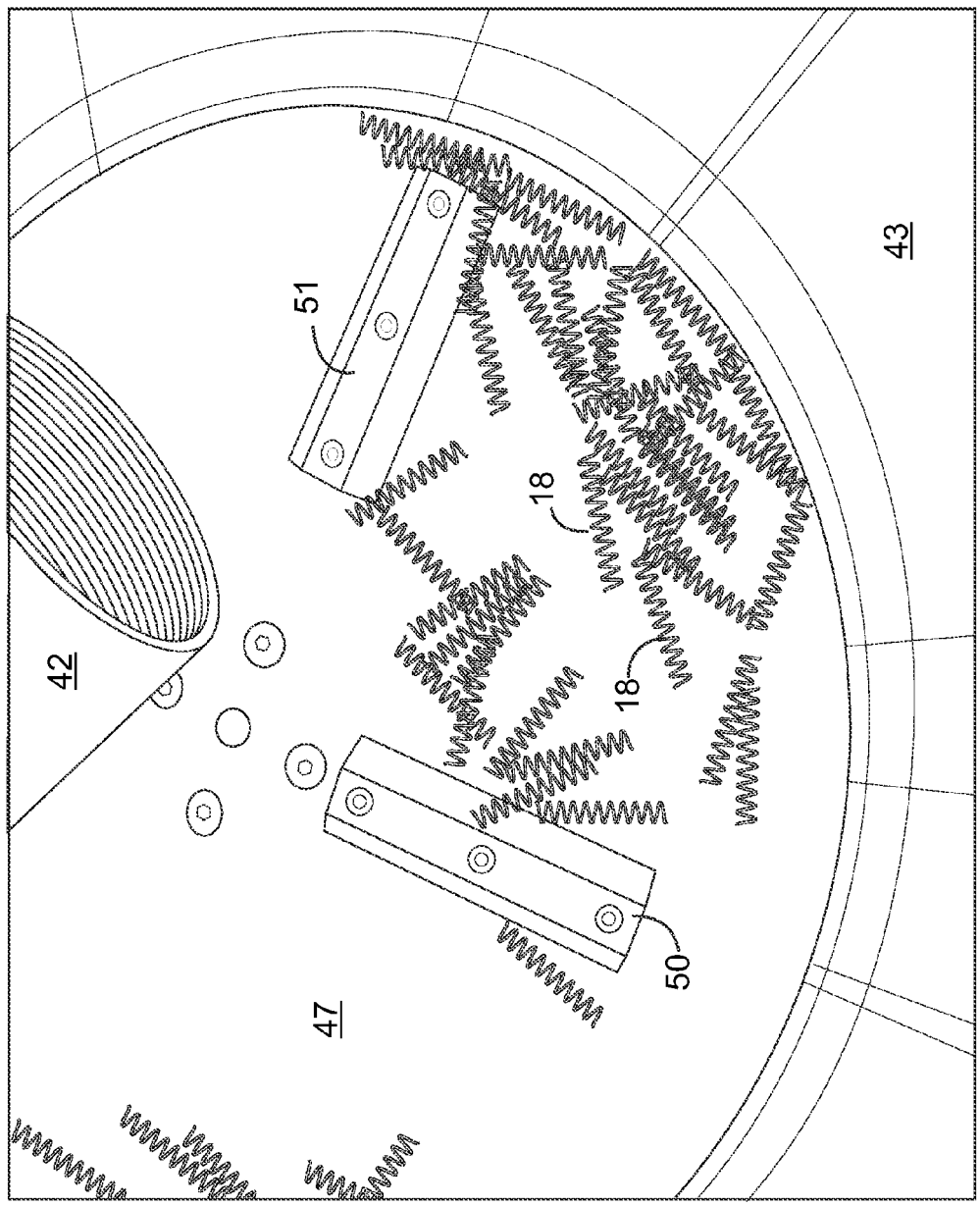
FIG. 5 is a fragmentary top detail plan view of the detangler chamber showing a bent internal end of the feed funnel, the bumpers on the rotatable bottom disk thereof, and a vertical barrier along an interior side wall of the chamber.

As shown most clearly in FIG. 5, the funnel shape opening 40 allows springs to fall into the detangler chamber 14, but deposits them on one side of the chamber because the bottom outlet 42 of the funnel shape opening 40 is curved at an angle toward one side of the chamber in order to prevent springs 18-18 from jumping out of the chamber through the funnel 40 during operation. This is contrary to the teachings in the above identified prior art.

Figure 6:
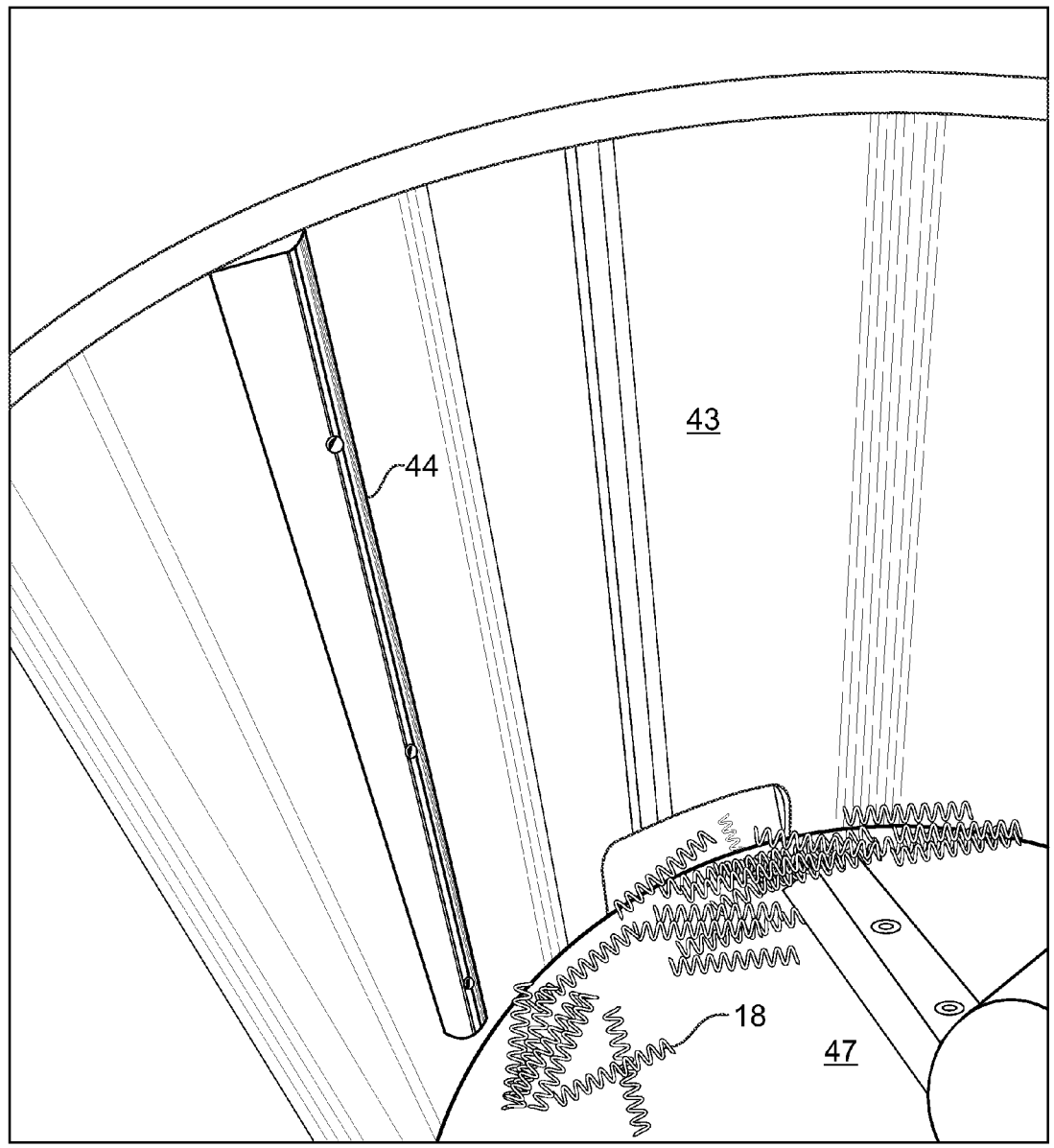
FIG. 6 is an enlarged fragmentary perspective view of the vertical barrier shown in FIG. 5.
Figure 7:
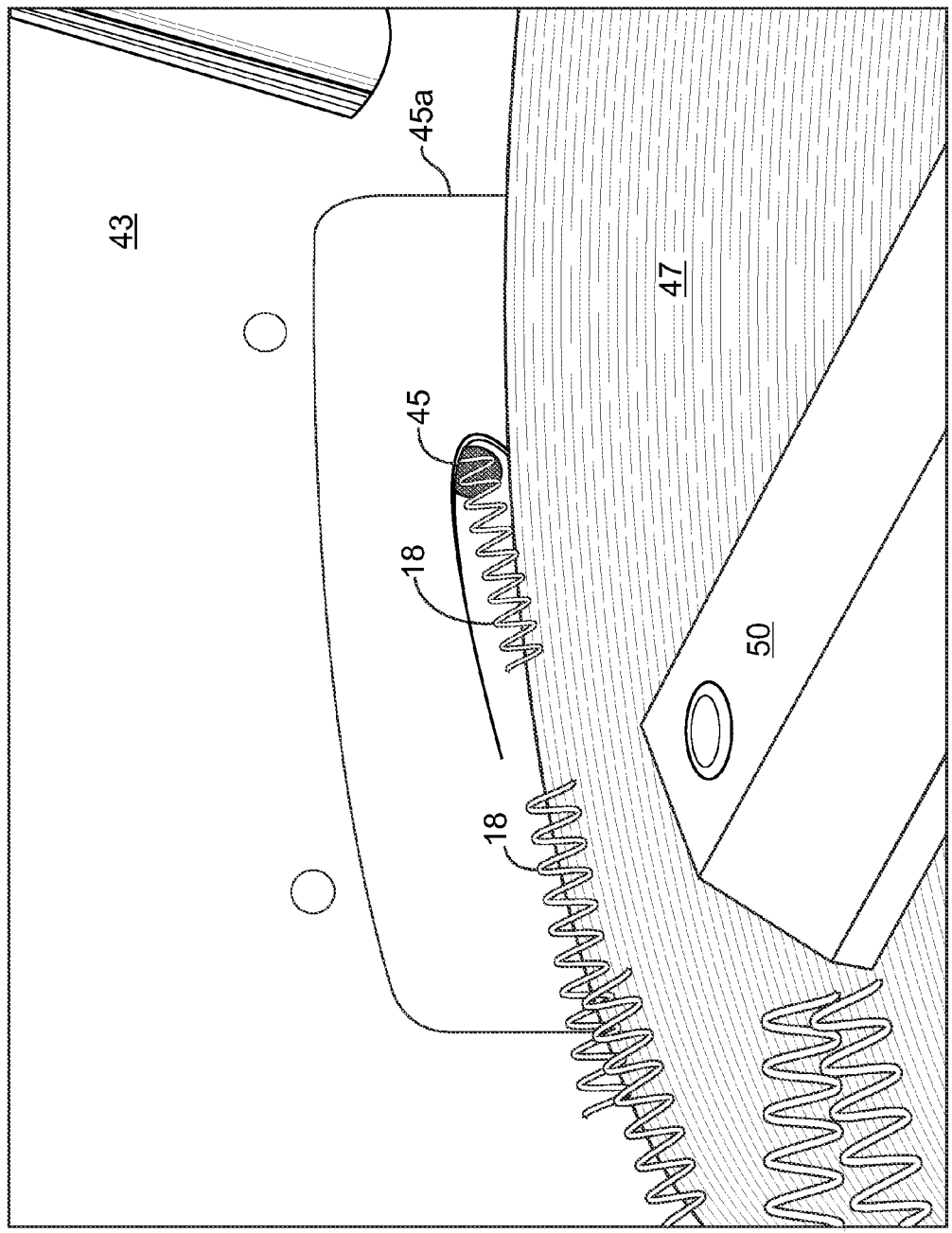
FIG. 7 is an enlarged detail perspective view of the spring feed tube entry adjacent the bottom of the detangler chamber, adjacent the vertical barrier and spaced from the end of bumpers therein.
Figure 9:
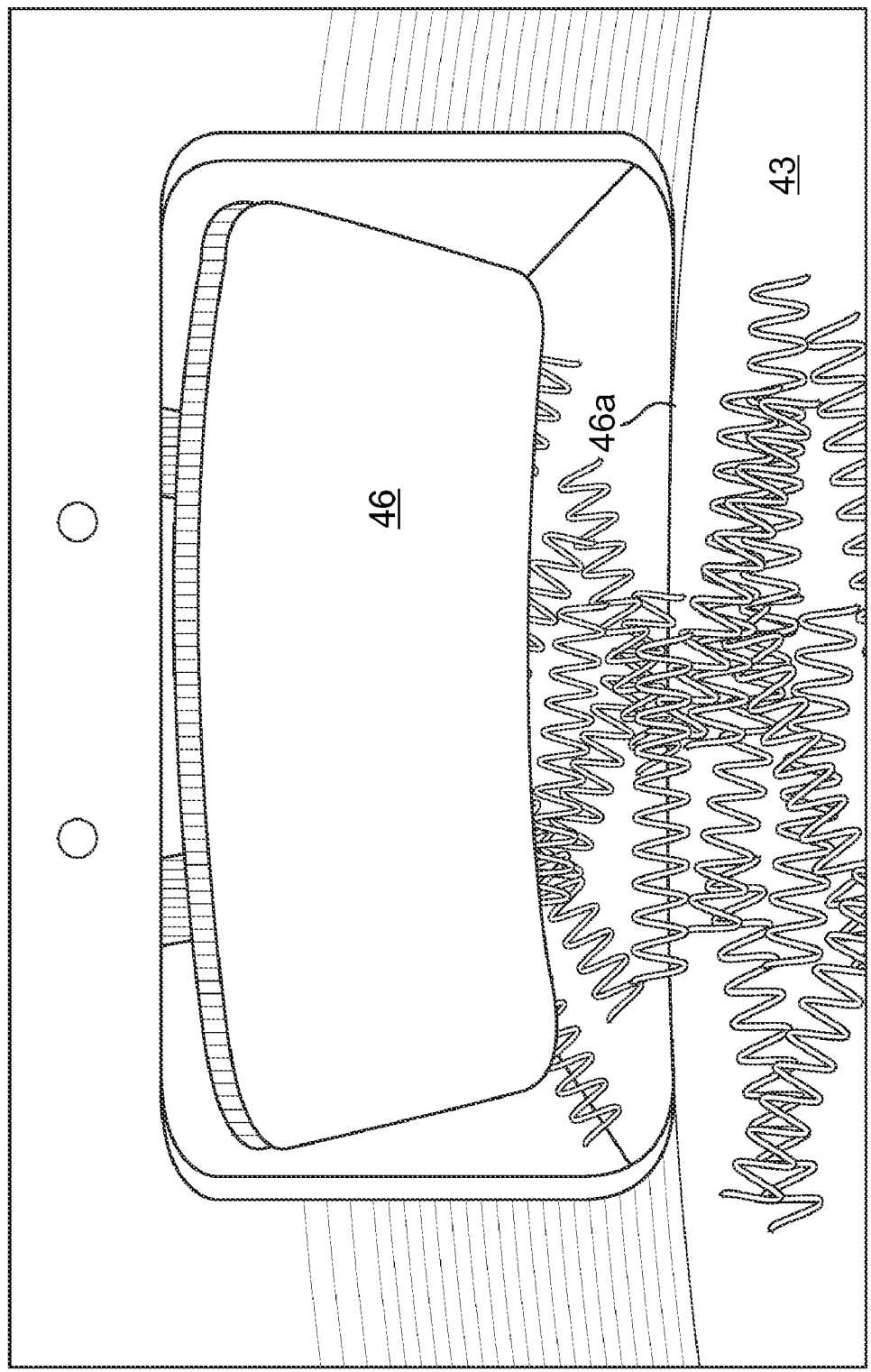
FIG. 9 is an enlarged detail elevational view of a dumping door as mounted in an aperture in the detangler chamber for removing stubborn clumps of tangled spring without the necessity of shutting down the machine.

As most clearly shown in FIGS. 5, 6 and 7, the inside of the detangler chamber 14 is generally hollow cylindrical in shape and includes a hollow side wall 43 that in the preferred embodiment includes a vertical bar shape obstruction 44, which may be made of stainless steel, rubber, PTFE, polyurethane or the like, and, in this embodiment, three outlet openings, the first 45, and second 45a, positioned 180 degrees apart in the chamber, are shaped and sized to accept individual detangled springs therethrough and are fitted with a vacuum tube to be discussed in more detail below. Also, as shown most clearly in FIG. 9, a third spring outlet opening 46 midway between on side of the chamber from first and second spring outlet openings 45, 45a will, when open, direct intransient clumps of springs outwardly of the chamber 14 through auto void outlet 17. This may be accomplished while the detangler is still in operation without shutting down the machine.

As shown in FIGS. 5, 6 and 7, in one important aspect of the present invention, a vertical obstruction, or in this case, a stainless steel rod 44 is positioned to extend upwardly along the height of the inside side wall 43 of the detangler chamber 14 adjacent the location of one of the spring feed outlet openings 45. The circular motion of rotating disk 47 with its bumpers thereon, tends to drive individual springs 18-18 centrifugally outward along the side wall. The obstruction 44 deflects any springs traveling along the sidewall and causes them to fly all over the chamber, tending to separate while doing so, as well as causing some of them to individually drop down to the rotating disk where they are closely positioned to enter either of the spring outlet openings 45a (second one not shown but identical to the first) and be drawn therein by a vacuum.

Tangled springs made of differing materials, shapes and sizes react differently to bumpers, therefore, bumpers of differing shapes and materials may be utilized where they provide the greatest opportunity for detangling the springs. Bumpers may be semi circular, elliptical, or other cross sectional shape within the scope of the invention and may also be made of metal, rubber, polyurethane, etc. as found most appropriate on an individual basis.

Figure 8:
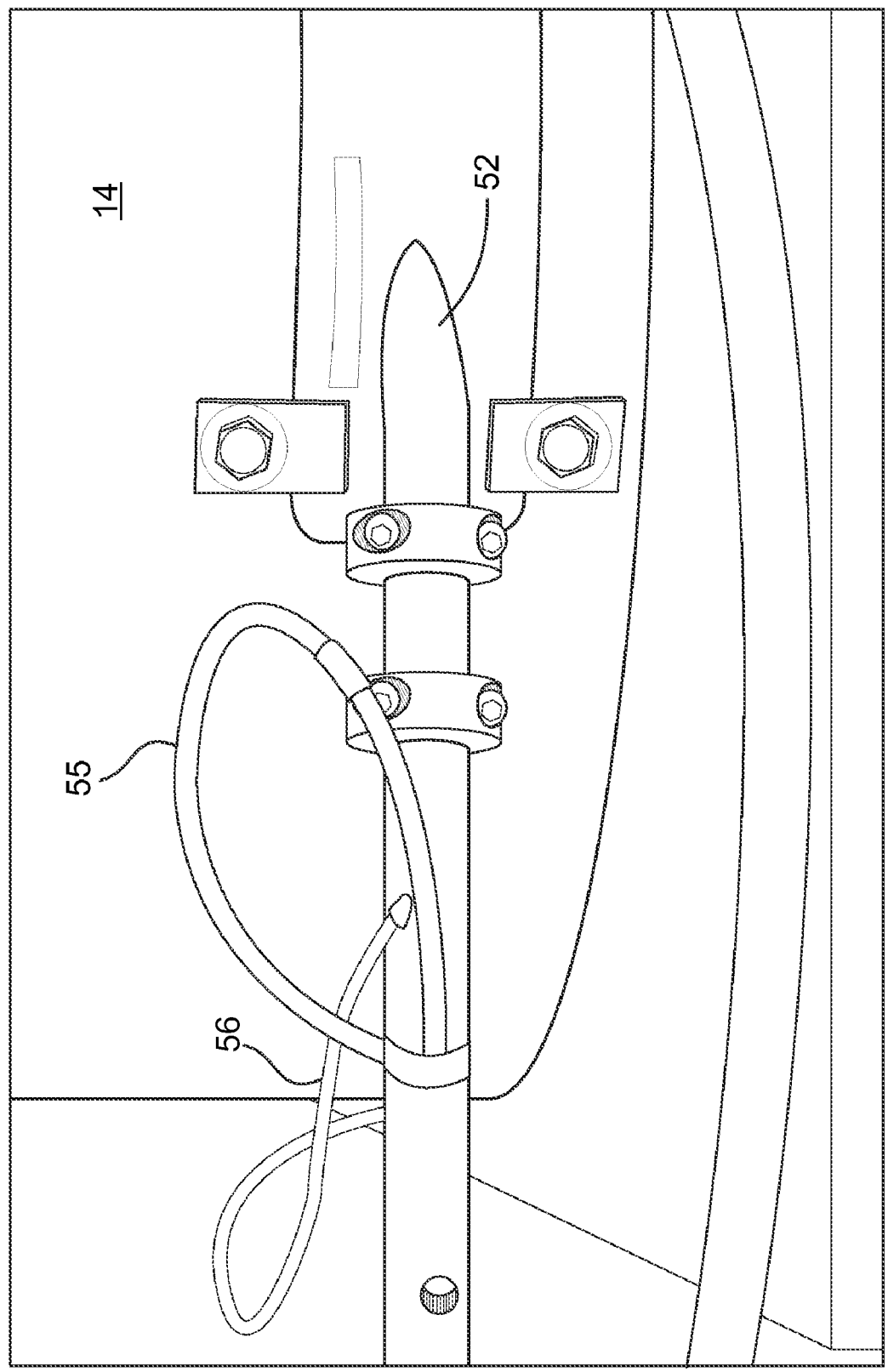
FIG. 8 is an enlarged detail elevational view of the exterior of the detangler chamber showing exterior of the feed tube entry.

In one important aspect of the present invention, the bumpers 50, 51 do not extend to the edge or outer circumference of the cylindrical disk 47, but leave a space between the end of the bumper 50-51 and the outer edge of the circular disk. The prior art teaches that it is important that such bumpers extend to the outer edge of the driving disk so that springs do not become entangled and jammed in a space between the end of the bumper and the outer edge of the disk and hinder rotation of the disk in the chamber. It has been found that by leaving such a space between the outer edge of the bumpers 50-51 and the outer edge of the disk 47, detangled individual springs 18-18 tend to position themselves in that space in the outer edge of the rotating disk, and the centrifugal force of rotation tends to move the springs to line up along the outer edge of the disk generally tangential to the radius of the disk. As such, the springs will line up along the outer edge of the disk and, slightly as the convex shaped disk rotates, they will tend to feed into the first and second spring outlet openings 45 where a vacuum will draw them through the outlet openings 45 into the dispenser feeds 16, 16a, shown generally in FIGS. 1, 2 and 8. The vacuum at feed tube inlet 45 is caused by the compressed air in tube 55 forming a low pressure area behind its flow in the dispenser feed 16. Once a spring 18 is drawn into the feed tube 45 and past the compressed air at 55, it is pushed up to the dispenser 20. A backflow tube 56 of compressed air is capable of cleaning out the opening 45 if a clump of springs should block the entrance.

As shown in FIGS. 5, 6 and 7 in one important aspect of the present invention, a vertical discontinuity in the chamber sidewall, in this case, a stainless steel rod 44, is positioned to extend upwardly along the height of the inside side wall 43 of the detangler chamber 14 adjacent the location of one of the spring feed outlet openings 45. The circular motion of rotating disk 47 tends to drive individual springs 18-18 centrifugally outward along the side wall. The obstruction 44 stops any springs traveling along the sidewall and causes them to fly all over the chamber, thus tending to separate the springs. Some of the springs 18 drop down to the rotating disk where they are closely positioned to enter the first and second spring outlet openings 45a and be drawn therein by a vacuum.

By leaving a space on the circular disk between the end of the bumpers and the edge of the disk, the spring feed tubes 52 can be positioned adjacent the bottom of the detangler chamber rather than up the side wall thereof as shown in the prior art. Also, with the feed tube positioned adjacent the edge of the circular disk, the positioning of detangled springs is fed into the feed tubes in a much more orderly and efficient manner than the random feeding of springs into a raised outlet adjacent the top of the chamber as shown in the prior art.

Bumpers 50, 51 may be positioned two on a disk (180 degrees apart), on either side of the central portion thereof, or four on a disk, at 90 degree angles to each other, or in other varying configurations depending, during service, on which seems to provide the best detangling.

With the assembly as shown in the preferred embodiment, the springs 18-18 do not have to bounce upwardly from the rotating cylinder to impinge against the side wall to find an outlet aperture such as shown in the prior art. The springs 18-18, after detangling, may slide up against the bottom side of the side wall on the rotating disk and be centrifugally moved outward to a position where they will move into the feed tube 52.

Figure 10:
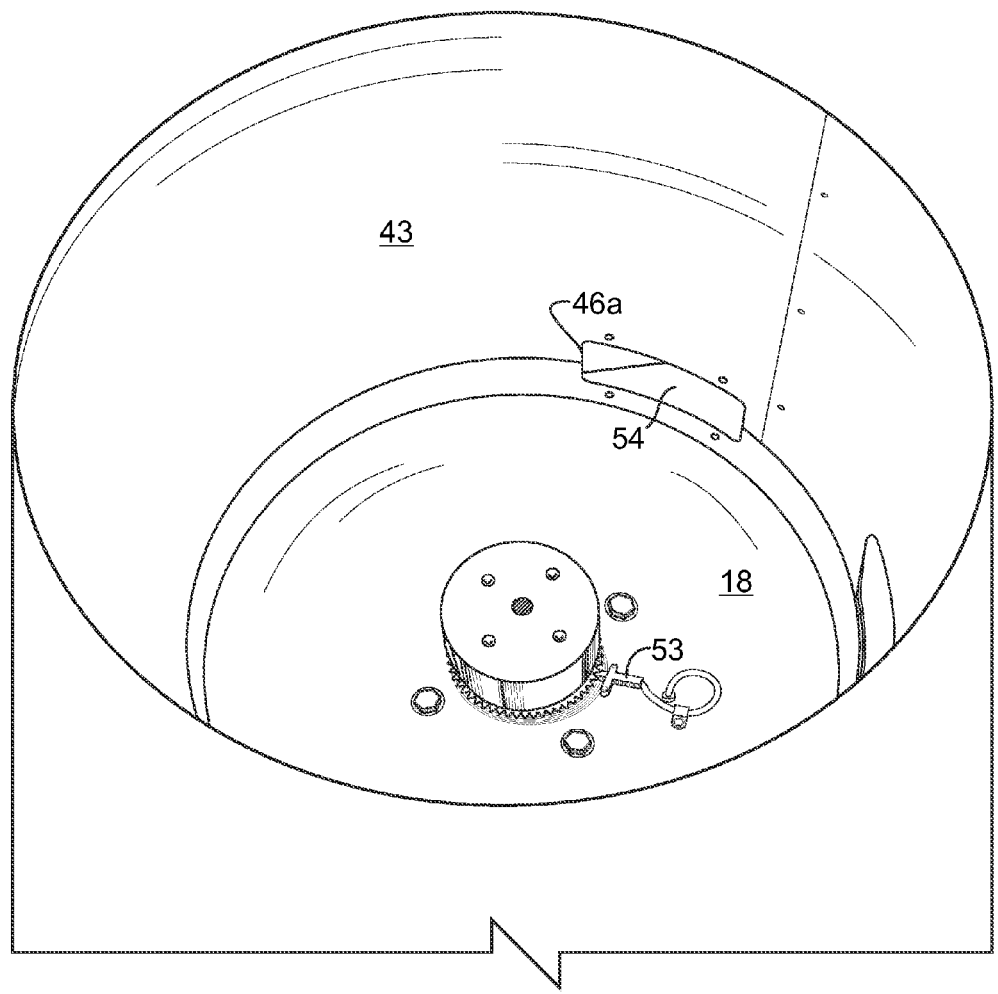
FIG. 10 is a three-quarter top fragmentary perspective view, with portions removed, of the port or aperture for the dumping door shown in FIG. 9.
Figure 11:
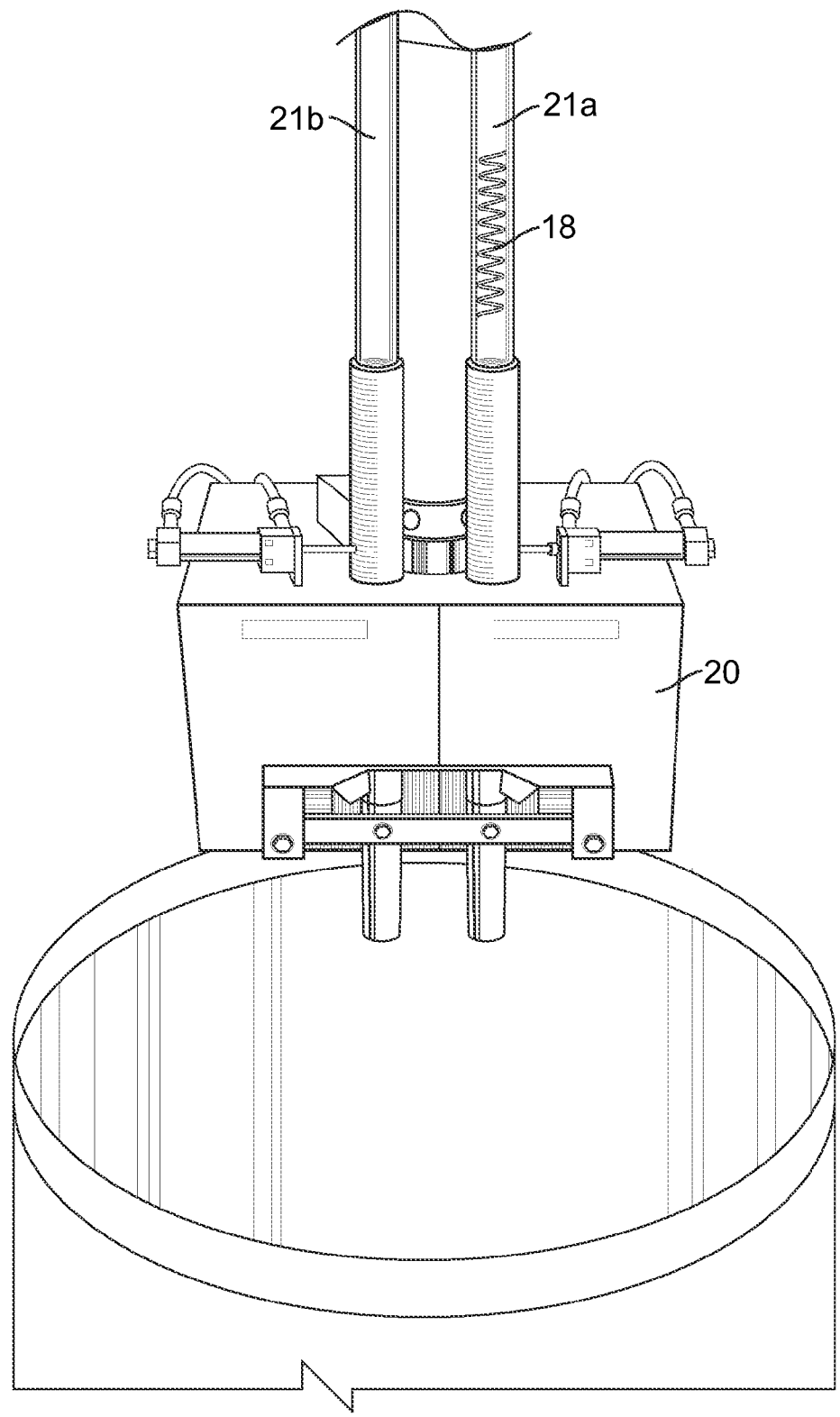
FIG. 11 is an end elevational view of the dispenser shown in FIG. 1.
Figure 12:
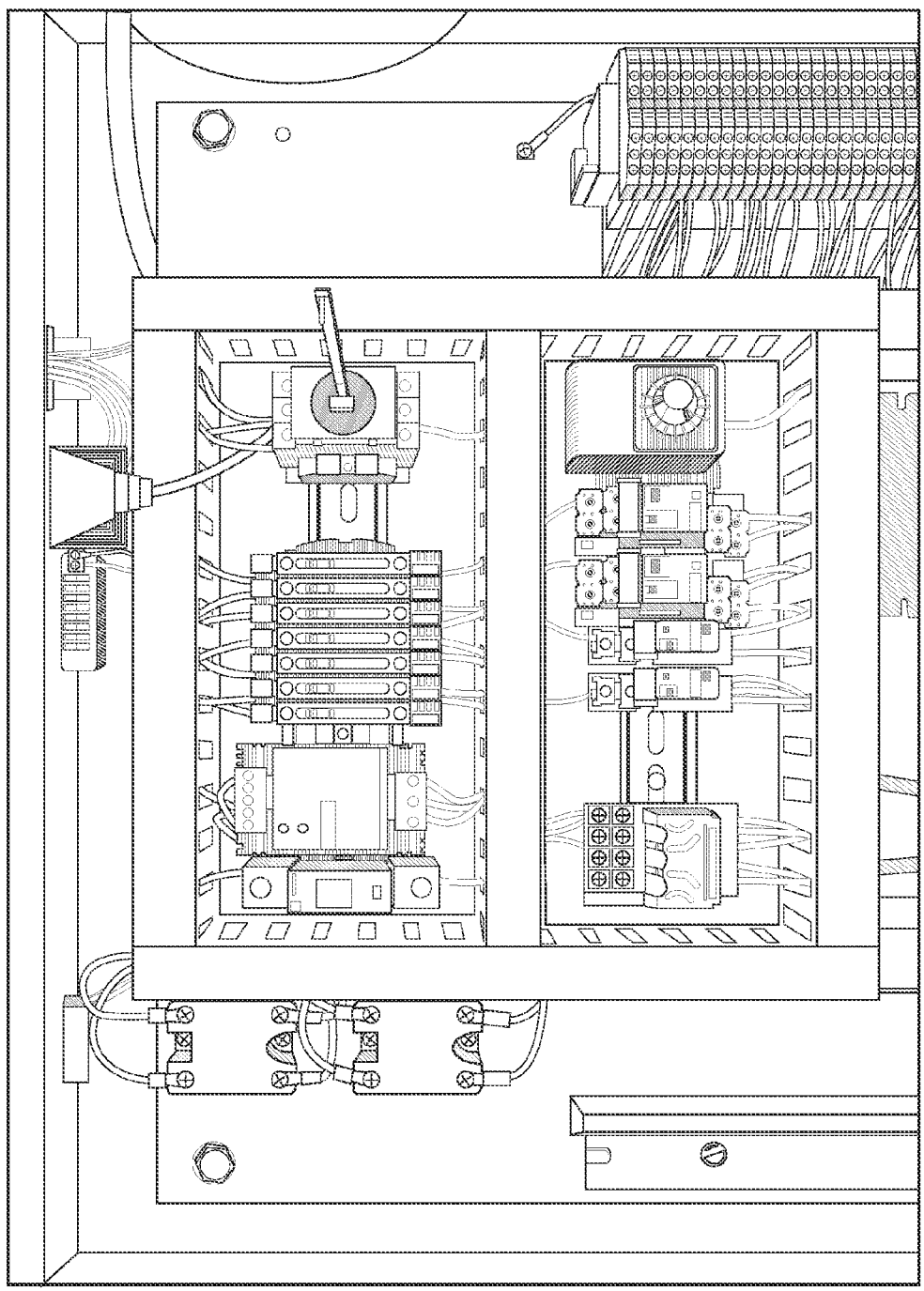
FIG. 12 is an elevational view of the inside of the electric control panel for the spring detangler of the invention.

Referring to FIG. 10, the bottom of the detangler chamber 18 is shown. The slightly convex circular disk 47 rotates in closely spaced relation thereabove. A counter 53 or sensor measures the revolutions per minute of the drive shaft for the circular disk 47 which information is fed back to the control panel 12.

The third spring outlet opening 46a as similarly to the first and second outlet opening 45a is rectangular in shape and provide the opening for a passageway that is tangential to the outside of the hollow cylindrical spring detangler. That passageway 54 leads to the auto-void outlet 17 shown to the right of the detangler chamber 14. The outlet opening door 46 is capable of being utilized or opened during operation of the detangler to allow recalcitrant clumps of springs to exit the detangler without shutting the machine down and possibly negatively affecting the assembly line to which the springs are fed. This is a significant advantage over the prior art.

Referring to FIGS. 8, 1, 2, and 11, after an individual spring 18 moves through the first or second spring outlet opening 45, it is drawn therein by a vacuum and proceeds through the tubes 21a, 21b upward to the dispenser 20 where air pressure will deliver one or more strings (if the number of feed tubes is increased) to a station or multiple stations near or at an assembly line where the springs 18-18 will be dispensed either to an operator or to a robotic means for positioning of the spring on a product moving along the assembly line (not shown).

The dispenser will dispense the springs at any rate chosen by the operator. The springs will move through the feed tube 52 at an uneven rate, but the length of the feed tube 21 moving up to the dispenser 20 will allow for the accumulation of springs 18-18 therein such that the dispenser rate can be made at an even time interval and controlled at the control panel 12.

Thus, a new and improved spring detangler assembly has been shown and described. While one embodiment and a prototype or modification thereof has been shown, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. A spring detangling apparatus including a generally hollow cylindrical housing having a rotating disk inwardly adjacent a bottom of said housing, an improvement comprising:
    means for providing a centrifugal action by the rotation of said cylindrical disk outwardly moving any spring positioned thereon to a position substantially tangential to an outer edge of said disk,
    said housing including a first discharge opening in a side wall of said housing outwardly supradjacent said disk having a shape substantially similar to and larger than a cross section of the shape of any spring to be fed through said apparatus, and
    means for drawing a vacuum through said first discharge opening to physically draw individual springs threadjacent into and through said first discharge opening.

2. The spring detangling apparatus as defined in claim 1 wherein said circular disk further includes,
   a convex top surface,
   a bumper positioned on said convex top surface of said circular disk and extending radially outwardly of a center thereof for imparting additional movement to any springs impinging thereon tending to cause such springs to disentangle, said bumper terminating at a radially outward end thereof in spatial relation to an outer edge of said circular disk for allowing any such individual springs to be positioned adjacent said first discharge opening.

3. The string detangling apparatus as defined in claim 2 wherein said bumper is made of one of metal, rubber and polyurethane.

4. The spring detangling apparatus as defined in claim 1 wherein said hollow cylindrical housing further includes,
   inwardly protruding generally vertical member positioned on an inside of said sidewall of said housing supra-adjacent said discharge opening for stopping springs from traveling along the interior side wall of said housing spatially above said rotating circular disk, thereby tending to deposit said springs adjacent said first discharge opening.

5. The spring detangling apparatus as defined in claim 1 further including:
   a multi-auger feed mechanism with an exit suprajacent an upper opening of said cylindrical housing.

6. A spring detangling apparatus including a generally hollow cylindrical housing having a rotating disk inwardly adjacent a bottom of said housing, an improvement comprising:
   means for providing a centrifugal action by the rotation of said cylindrical disk outwardly moving any spring positioned thereon to a position substantially tangential to an outer edge of said disk,
   said housing including a first discharge opening in a side wall of said housing outwardly supradjacent said disk having a shape substantially similar to and larger than a cross section of the shape of any spring to be fed through said apparatus, and
   means for drawing a vacuum through said first discharge opening to physically draw individual springs thereadjacent into and through said first discharge opening, and
   a second discharge opening positioned in a side wall of said housing, larger than said first discharge opening in spatial circumferential relation from said first discharge opening for receiving recalcitrant clumps of springs therethrough while said apparatus is operating.

7. The spring detangling apparatus as defined in claim 6 wherein:
   said second discharge opening has a selectively openable closure door covering same, said door having an inner surface curved to match the curvature of said side wall.

8. The spring detangling apparatus as defined in claim 6 wherein:
   an air line extends from said first discharge opening to a spring dispenser, and
   said air line being in communication with the air intake side of a compressor via a pneumatic manifold.

9. The spring detangling apparatus as defined in claim 6 further including:
   a multi-auger feed mechanism with an exit suprajacent an upper opening of said cylindrical housing.

10. A spring detangling apparatus including a generally hollow cylindrical housing having a rotating disk inwardly adjacent a bottom of said housing, an improvement comprising:
    said disk including a top surface having a generally radially extending bumper thereon that terminates in spatial relation to an outer circumference of said disk;
    said housing including a first discharge opening in a side wall of said housing outwardly adjacent said disk, said first discharge opening having a shape substantially similar to and larger than a cross-section of the shape of any spring to be fed through said apparatus,
    an inwardly protruding generally vertical member positioned on an inside of said sidewall of said housing supra-adjacent said discharge opening for stopping springs from traveling along the interior side wall of said housing spatially above said rotating circular disk, thereby tending to deposit said springs adjacent said first discharge opening; and
    a vacuum line in communication with said first discharge opening outside of said housing for drawing individual springs thereadjacent into and through said first discharge opening.

11. The spring detangling apparatus as defined in claim 10 further including,
    a second discharge opening in a side wall of said housing, larger than said first discharge opening and positioned in spatial circumferential relation from said first discharge opening for receiving recalcitrant clumps of springs therethrough while said apparatus is operating.

12. The spring detangling apparatus as defined in claim 11 wherein:
    said second discharge opening has a selectively openable closure door covering same, said door having an inner surface curved to match the curvature of said side wall.

13. The spring detangling apparatus as defined in claim 10 further including:
    a multi-auger feed mechanism with an exit suprajacent an upper opening of said cylindrical housing.

* * * * *